A. CANDLE.
LAMP SHIFTING MECHANISM FOR STREET CARS.
APPLICATION FILED AUG. 28, 1911.
1,008,948.
Patented Nov. 14, 1911.
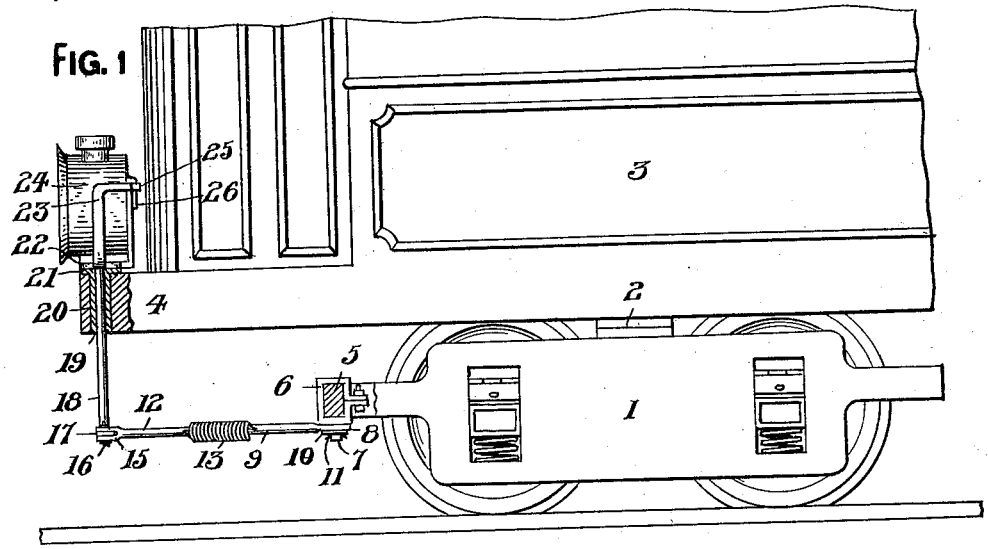
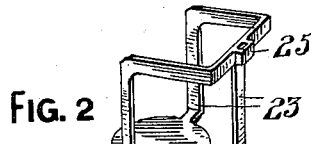
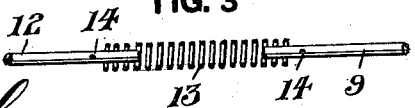
WITNESSES
INVENTOR
A. Candle
BY
ATTORNEYS

UNITED STATES PATENT OFFICE.

AUGUSTINE CANDLE, OF LEETONIA, OHIO.

LAMP-SHIFTING MECHANISM FOR STREET-CARS.

1,008,948.  Specification of Letters Patent.  Patented Nov. 14, 1911.

Application filed August 28, 1911. Serial No. 646,331.

*To all whom it may concern:*

Be it known that I, AUGUSTINE CANDLE, citizen of the United States of America, residing at Leetonia, in the county of Columbiana and State of Ohio, have invented certain new and useful Improvements in Lamp-Shifting Mechanism for Street-Cars, of which the following is a specification, reference being had therein to the accompanying drawing.

This invention relates to lamps for vehicles, and more particularly to a lamp shifting mechanism for cars of city and suburban railway lines.

The primary object of my invention is to provide a lamp or lantern shifting mechanism that will be actuated by the trucks of a car, whereby the lamp or lantern will cast rays of light in the direction in which the forward truck of a car is moving, thereby preventing the rays of light from being cast to one side of the track when the car is passing around a curve.

Another object of this invention is to provide a lamp shifting mechanism that can be used in connection with various types of cars or vehicles without interfering with the fender or brake rigging of the car.

A further object of this invention is to furnish a simple and inexpensive lamp shifting mechanism, with means for compensating for vibrations between a car body and the forward truck supporting said body.

With the above and other objects in view, the invention resides in the novel construction, combination, and arrangement of parts to be hereinafter specifically described and then claimed.

Reference will now be had to the drawing, wherein—

Figure 1 is a side elevation of a portion of a car provided with the lamp shifting mechanism, the car being partly broken away and partly in section; Fig. 2 is a perspective view of a detached lamp shifting mechanism. Fig. 3 is a longitudinal sectional view of a compensating spring used in connection with the mechanism.

The reference numeral 1 denotes one of the truck frames of a truck 2, said truck supporting a car body 3 having a platform 4. The truck frames 1 of the car are connected by a transverse bar 5, and secured to this bar, adjacent to the ends thereof are straps 6. These straps are provided with depending pins 7, and loosely mounted upon said pins are eye-let ends of rear rods 9. The eye-let ends 8 of said rods are retained upon the pin 7 by washers 10 and cotter pins 11. Associated with the rear rods 9 are forward rods, said rods being connected to the rear rods 9 by coiled compensating springs 13 which have the end convolutions thereof connected to said rods, as at 14.

The forward ends of the rods 12 are bifurcated, as at 15, and pivotally connected by pins 16 to a cross head 17 carried by the lower end of a vertical shaft 18. The shaft 18 extends through a bushing 19 mounted in an opening 20 provided therefor in the platform 4. The upper end of the bushing 19 has a bearing plate 21 for base plate 22 of a lamp or lantern holding frame 23 adapted to support a lamp or lantern 24. The frame 23 has a socket 25 for a hook 26 carried by the lamp or lantern. The invention however is not limited to the form of the lamp holder or the type of lamp or lantern carried thereby.

It is obvious that a movement of the forward truck of the car when rounding a curve will shift the crosshead 17 and rotate the shaft 18, whereby the lamp or lantern 24 will cast its rays in the direction in which the forward truck is traveling.

The lamp shifting mechanism can be made of light and durable metal and of such sizes as to be applicable to various types of cars.

What I claim is:

1. A lamp shifting mechanism for cars comprising a transversely extending crosshead arranged below the platform of the car, a vertically disposed shiftable shaft extending up through the platform of the car, a base plate mounted upon the upper end of said shaft, a frame including side and rear bars having angular ends integral with the edge of said base plate, said frame further including a U-shaped top bar integral with the side and rear bars and with the rear member of the top bar provided with a socket and extensible and contractible members pivotally connected to said crosshead and to the forward truck frames of the car.

2. A lamp shifting mechanism for cars comprising a transversely extending crosshead arranged below the platform of the car, a shiftable shaft carried by said crosshead and extending up through the platform of the car, a base plate mounted upon the top of said shaft, a vertically disposed frame carried by the base plate and open at its front and top and extensible and contractible members pivotally connected to the ends of the crosshead and to the forward truck frames of the car, said frame at the rear of its upper portion provided with a socket for the reception of a hook carried by the lamp supported by the base plate.

In testimony whereof I affix my signature in the presence of two witnesses.

AUGUSTINE CANDLE.

Witnesses:
 JOHN B. MORGAN,
 JESSIE J. GALLAGHER.

Copies of this patent may be obtained for five cents each, by addressing the "Commissioner of Patents, Washington, D. C."